(12) United States Patent
Lyon et al.

(10) Patent No.: US 8,144,331 B2
(45) Date of Patent: Mar. 27, 2012

(54) SYSTEMS, COMPUTER-IMPLEMENTED METHODS, AND TANGIBLE COMPUTER-READABLE STORAGE MEDIA FOR WIDE-FIELD INTERFEROMETRY

(75) Inventors: Richard G. Lyon, Marriottsville, MD (US); David T. Leisawitz, Ellicott City, MD (US); Stephen A. Rinehart, Washington, DC (US); Nargess Memarsadeghi, Silver Spring, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 399 days.

(21) Appl. No.: 12/487,454

(22) Filed: Jun. 18, 2009

(65) Prior Publication Data

US 2010/0321699 A1 Dec. 23, 2010

(51) Int. Cl.
*G01B 9/02* (2006.01)
*G01J 3/45* (2006.01)

(52) U.S. Cl. ........................ 356/450; 356/456

(58) Field of Classification Search .............. 356/450, 356/456
See application file for complete search history.

(56) References Cited

U.S. PATENT DOCUMENTS

| | | | | |
|---|---|---|---|---|
| 6,963,405 B1 * | 11/2005 | Wheel et al. | ................ | 356/456 |
| 7,352,470 B1 * | 4/2008 | Kendrick et al. | ............ | 356/456 |
| 7,460,239 B2 * | 12/2008 | Falzon et al. | ................ | 356/450 |

OTHER PUBLICATIONS

Leisawitz, David T. et al. "Wide-field imaging interferometry testbed I: purpose, testbed design, data, and synthesis algorithms". Proc. SPIE 4852, 255 (2003).*
Rinehart, S. A. et al. "The wide-field imaging interferometry testbed: recent results". Proc. SPIE 6268, 626836 (2006).*
Rinehart, S. et al. "The wide-field imaging interferometry testbed (WIIT): recent progress and results". Proc. SPIE 7013, 70132S (2008).*
Lyon, Richard G. et al. "Wide-field imaging interferometry testbed (WIIT): image construction algorithms". Proc. SPIE 7013, 70131M (2008).*

* cited by examiner

*Primary Examiner* — Michael A Lyons

(57) ABSTRACT

Disclosed herein are systems, computer-implemented methods, and tangible computer-readable storage media for wide field imaging interferometry. The method includes for each point in a two dimensional detector array over a field of view of an image: gathering a first interferogram from a first detector and a second interferogram from a second detector, modulating a path-length for a signal from an image associated with the first interferogram in the first detector, overlaying first data from the modulated first detector and second data from the second detector, and tracking the modulating at every point in a two dimensional detector array comprising the first detector and the second detector over a field of view for the image. The method then generates a widefield data cube based on the overlaid first data and second data for each point. The method can generate an image from the widefield data cube.

19 Claims, 14 Drawing Sheets

FIG. 8
DIRTY BEAM
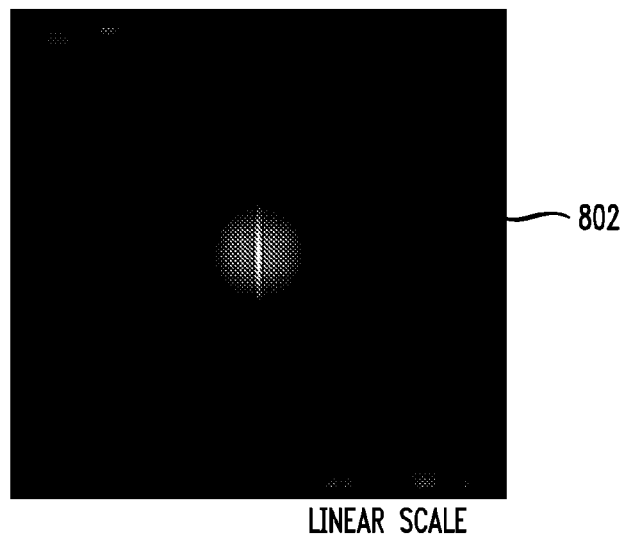
LINEAR SCALE
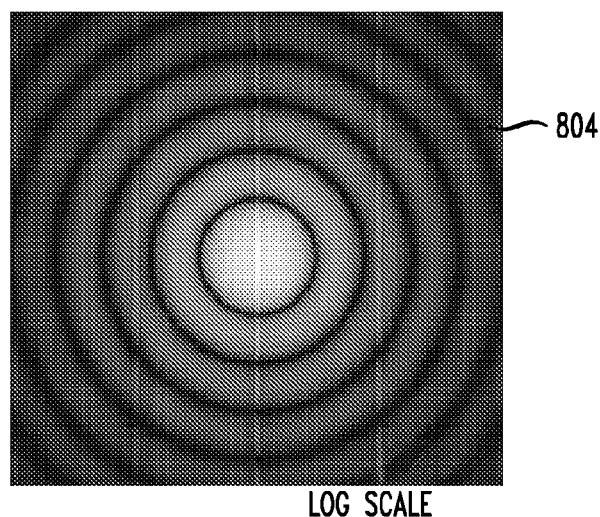
LOG SCALE
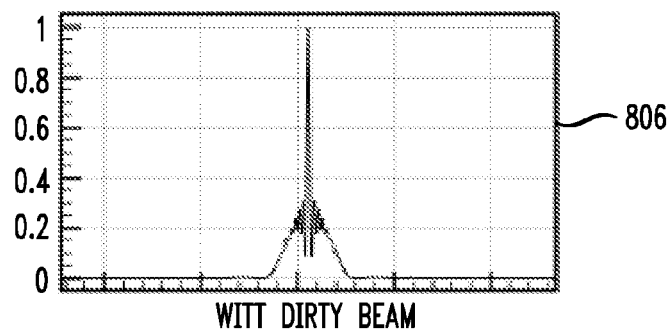
WITT DIRTY BEAM

SYSTEMS, COMPUTER-IMPLEMENTED METHODS, AND TANGIBLE COMPUTER-READABLE STORAGE MEDIA FOR WIDE-FIELD INTERFEROMETRY

ORIGIN

The disclosure described herein was developed by employees of the United States Government and may be manufactured and used by or for the United States Government for governmental purposes without the payment of any royalties thereon or therefore.

BACKGROUND

1. Technical Field

The present invention relates to interferometry and more specifically to wide field interferometry.

2. Introduction

Michelson imaging interferometry only allows for very narrow field-of-view imaging and spectroscopy. It is generally accepted that the field-of-view is limited to the angular extent of the core of the primary beam of $\pm\lambda/D$, where $\lambda$ is the wavelength and D is the diameter of a single aperture. However this limitation is not a fundamental physical limitation but arises due to the Van Cittert-Zernike theorem and single pixel or small format detectors. This interferometry approach is used in observing and measuring in space to construct images from multiple smaller, inexpensive telescopes, which rival images generated from much larger, more expensive telescopes which are difficult to construct and maintain. However, this traditional interferometry approach generates very narrow field images. Accordingly, what is needed in the art is improved wide field imaging.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and tangible computer-readable storage media for wide field imaging interferometry. The method includes for each point in a two dimensional detector array over a field of view of an image: gathering a first interferogram from a first detector and a second interferogram from a second detector, modulating a path-length for a signal from an image associated with the first interferogram in the first detector, overlaying first data from the modulated first detector and second data from the second detector, and tracking the modulating at every point in a two dimensional detector array comprising the first detector and the second detector over a field of view for the image. The method further generates a widefield data cube based on the overlaid first data and second data for each point. The method can generate an image from the widefield data cube. The first and second detectors can be selected from a group of three or more detectors. Either the first and/or second detectors can be different physical detectors for each point. The method can further gather more than one first and second interferograms at different distances between the first and second detectors for each point in the two dimensional detector array. The method can gather more than one first and second interferograms at different locations for the first and second detectors for each point in the two dimensional detector array. The interferograms can represent visible light, non-visible light, sound, or other waves. In one embodiment, the detectors are telescopes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8 illustrates an exemplary WIIT dirty beam;

DETAILED DESCRIPTION

Wide-field imaging interferometry testbed (WIIT) can demonstrate imaging and spectroscopy over fields-of-view larger than the typically narrow primary beam footprint of a conventional Michelson interferometer. At the heart of this technique is the "double-Fourier" approach in which the apertures and a delay line are both moved to collect interferograms over a two dimensional wide field detector grid simultaneously, one interferogram per detector pixel. This aggregate set of interferograms, as a function of baseline and delay line, is algorithmically processed to construct a hyperspectral image cube. Algorithms and approaches to construct the image cube are disclosed herein.

Classical Michelson imaging interferometry allows for high spatial and spectral resolution imaging over a small field of view (FOV). The double-Fourier Michelson technique expands the FOV, allowing for wide field imaging and spectroscopy of each pixel of the high resolution, wide-field image. In double Fourier wide field imaging interferometry, the fields are combined in the pupil plane but the data is collected in a wide format focal plane. A baseline algorithm converts the collected data to a hyperspectral data cube consisting of two dimensional high resolution wide format images, one image per wavelength (or frequency). A detailed mathematical analysis, set forth below, includes polarization and other effects. A physical optics model can estimate the dirty hyperspectral image data cube and ultimately deconvolute the estimated image cubes with missing or attenuated spatial frequencies. The treatment is via scalar field theory with no polarization effects. One advantage of this approach is that the construction of the dataset and the wide-field imaging algorithms can be concisely understood with the equations and derivations set forth below.

As a preliminary matter, various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
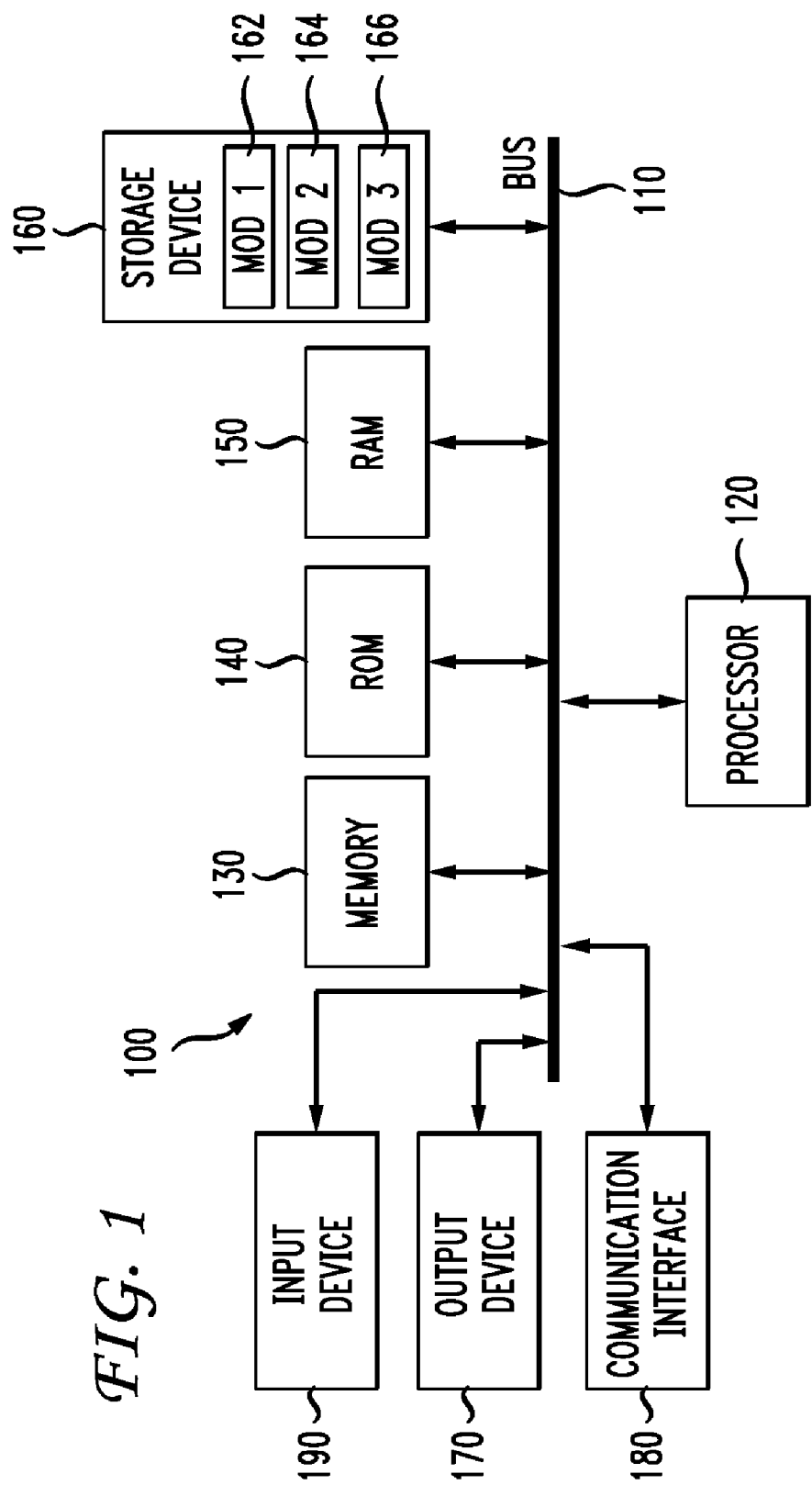
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as comprising individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
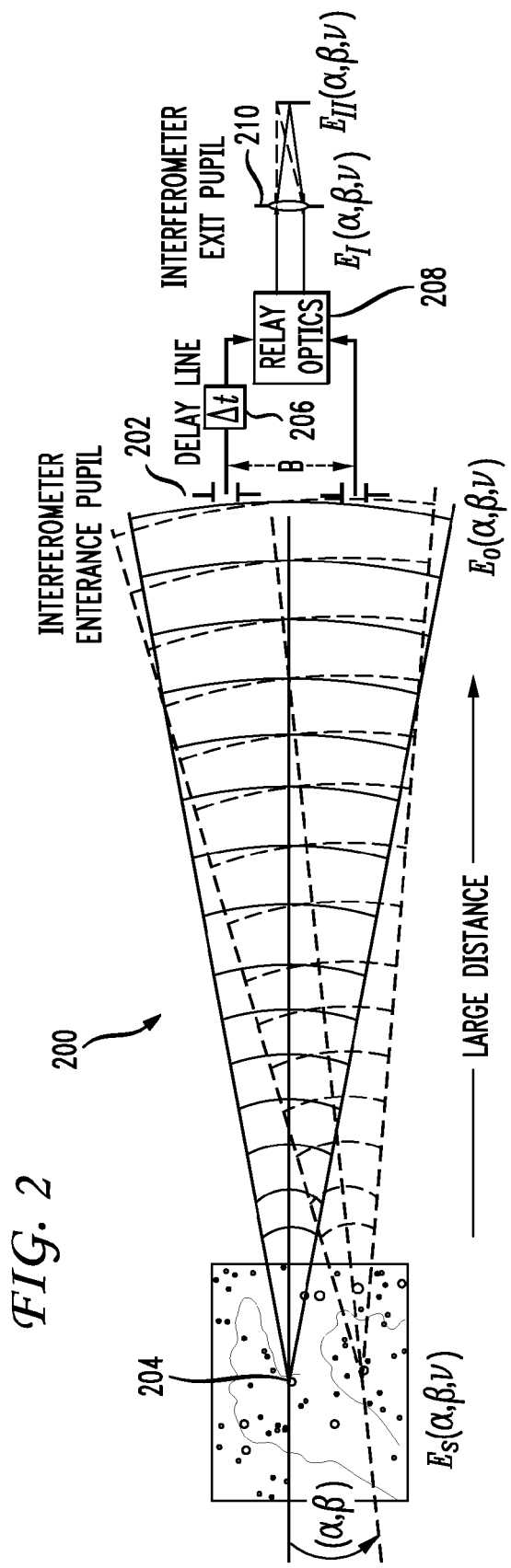
FIG. 2 illustrates an example simplified schematic of an interferometer.

Having disclosed some basic system components, the disclosure now turns to the principles of wide-field Michelson imaging and specifically the mathematical model of wide-field Michelson imaging. The method embodiments set forth herein are discussed in terms of systems, such as the system 100 shown in FIG. 1, configured to practice the method. An interferometer operates based on the physical optics model of propagation through the interferometer to generate a focal plane image. FIG. 2 illustrates a simplified example schematic of an interferometer 200 for reference. Equation 1, shown below, describes the scalar electric field, at the plane of the interferometer's entrance pupil 202, due to a given emission point 204 on a distant source at a single optical frequency:

$$E_0(\alpha, \beta; \nu) = |E_0(\alpha, \beta; \nu)| e^{i\phi(\alpha,\beta;\nu)} e^{i\vec{k}\cdot\vec{r}} e^{-i2\pi\nu t} \quad (1)$$

where $(\alpha,\beta)$ are the sky angles, i.e. angular offsets from the line of sight pointing of the interferometer, and thus $(\alpha,\beta)=(0,0)$ defines the center of the field of view of the interferometer, i.e. its pointing. The optical frequency is given by $\nu=c/\lambda$ where c is the vacuum speed of light and $\lambda$ the vacuum wavelength. $\vec{r}=(x,y,z)$ are coordinates in the entrance pupil plane 202, where (x,y) are coordinates along the plane of the aperture and z is the distance from the source 204 to the aperture. $|E_0(\alpha,\oplus;\nu)|$ is a real valued function representing the field amplitude of a source point and a given frequency. $\theta(\alpha,\beta;\nu)$ represents a uniformly distributed random phase on the interval of $[-\pi,\pi]$ due to each source point at each frequency having a phase which is uncorrelated with all others over sky angles and frequencies. Each distant source point 204 emits a field that evolves to a spherical wave and at distances large with respect to the aperture is effectively a plane wave since the phase curvature varies little across the aperture. These uncorrelated spherical waves evolve at the aperture to angular plane waves with incoherent phases. This is expressed in the term $e^{i\vec{k}\cdot\vec{r}}$ where $$\vec{k} = \frac{2\pi\nu}{c}(\alpha, \beta, \gamma)$$

is the wave vector in the direction of propagation of that plane wave component and $(\alpha,\beta,\gamma)$ are direction cosines of that plane wave component such that $\alpha^2+\beta^2+\gamma^2=1$. For small angles, approximations $\alpha \approx \sin\alpha$, $\beta \approx \sin\beta$ and $\gamma \approx 1$ hold. Using these approximations $$\vec{k}\cdot\vec{r} = \frac{2\pi\nu}{c}(\alpha x + \beta y) + \frac{2\pi\nu}{c} z \text{ and}$$

$$e^{i\vec{k}\cdot\vec{r}} = e^{i\frac{2\pi\nu}{c}(\alpha x+\beta y)} e^{i\frac{2\pi\nu}{c} z}$$

yields for equation (1):

$$E_0(\alpha, \beta; \nu) = |E_0(\alpha, \beta; \nu)| e^{i\phi(\alpha\cdot\beta;\nu)} e^{i\frac{2\pi\nu}{c}(\alpha x+\beta y)} e^{i\frac{2\pi\nu}{c}z} e^{-i2\pi\nu t} \quad (2)$$

This represents the equation of a wave arriving from a sky angle of $(\alpha,\beta)$ and at frequency $\nu$. The total field at point (x,y,z) and time t, from all source frequencies and field angles, is given by the integral over all sky angles in the field of view and frequencies in the passband as:

$$E_0(x, y, z; t) = \qquad (3)$$
$$\int\int\int |E_0(\alpha, \beta; \nu)| e^{i\phi(\alpha,\beta;\nu)} e^{i\frac{2\pi\nu}{c}(\alpha x+\beta y)} e^{i2\pi\nu(\frac{z}{c}-t)} d\alpha d\beta d\nu$$

which takes the form of a 3D Fourier transform of $|E_0(\alpha,\beta;\nu)|e^{i\phi(\alpha,\beta;\nu)}$ and where $$\frac{z}{c} - t$$

is the delay due to the arrival of the light from the source.

In conventional narrow-field Michelson interferometry, the action of a Michelson interferometer is to overlay the fields from two spatially shifted apertures with an artificially induced time delay between one of the fields (delay line). The field at the entrance pupil 202 is truncated by the two apertures, each of diameter D. The center-to-center spacing of each aperture is denoted as the baseline B. The relay optics 208 shifts these two portions of the field such that they are overlaid and introduces a time delay via a delay line 206 in one arm such that they are coherently summed with the intensity given by:

$$I_1(x, y, z) = \qquad (4)$$
$$\left\langle \left| E_0\left(x-\frac{B_x}{2}, y-\frac{B_y}{2}, z; t-\frac{\Delta t}{2}\right) + E_0\left(x+\frac{B_x}{2}, y+\frac{B_y}{2}, z; t+\frac{\Delta t}{2}\right) \right|^2 \right\rangle$$

where $\vec{B}=(B_x,B_y)$ is the baseline vector, or the spacing of the two apertures in the entrance pupil plane and $\Delta t$ is the variable time delay. The intensity is given by $I_1(x,y,z)=\langle E_1(x,y,z;t)|^2 \rangle$ where $$\langle \cdots \rangle = \frac{1}{2\pi} \int_{-\pi}^{\pi} \cdots d\phi$$

denotes averaging over the random variable of phase. The phase is a random variable since each emitter in the incoherent source emits independently of all other source emitters. The intensity is evaluated by inserting the fields from equation (3) into (4) and evaluating to show:

$$I_1(x, y, z) = I_1(x, y, z) + I_2(x, y, z) + \qquad (5)$$
$$2\text{Re}\left\{ E_0\left(x-\frac{B_x}{2}, y-\frac{B_y}{2}, z; t-\frac{\Delta t}{2}\right) E_0^*\left(x+\frac{B_x}{2}, y+\frac{B_y}{2}, z; t+\frac{\Delta t}{2}\right) \right\}$$

where $I_1$ and $I_2$ represent the intensities over each sub-aperture. The interference occurs in the cross-term ($3^{rd}$ term).

Inserting the fields (equation 3) into this term and re-arranging and collecting like terms yields:

$$\langle E_0 E_0^* \rangle = \int \int \int |E_0(\alpha, \beta; v)|^2 e^{-i\frac{2\pi v}{c}[B_x\alpha + B_y\beta]} e^{-i2\pi v \Delta t} d\alpha d\beta dv d\beta' \quad (6)$$

Recognizing that $|E_0(\alpha,\beta;v)|^2$ is the emitted sky intensity at each sky angle and frequency provides the interferometer equation shown below:

$$I_1(x, y, z) + I_1(x, y, z) + I_2(x, y, z) + \quad (7)$$
$$2\text{Re}\left\{ \int \int \int I_0(\alpha, \beta; v) e^{-i\frac{2\pi v}{c}[B_x\alpha + B_y\beta]} e^{-2\pi v \Delta t} d\alpha d\beta dv \right\}$$

Equation (8) below shows the results of integrating all the flux in equation (7), i.e. integrate over (x,y):

$$I_1(B_x, B_y, \Delta t) = \quad (8)$$
$$I_1 + I_2 + 2\text{Re}\left\{ \int \int \int I_0(\alpha, \beta; v) e^{-i\frac{2\pi v}{c}[B_x\alpha + B_y\beta]} e^{-i2\pi v \Delta t} d\alpha d\beta dv \right\}$$

Factoring out $I_1+I_2=I_T$ yields and noting that both $I_1(\vec{B},\Delta t)$ and $I_0(\vec{\alpha};v)$ are both real yields the interferometer equation:

$$I_1(\vec{B}, \Delta t) = I_T\left\{ 1 + 2 \int \int \int \frac{I_0(\vec{\alpha}; v)}{I_T} \cos\left\{ 2\pi \left[ \frac{v}{c}\vec{B}\cdot\vec{\alpha} + v\Delta t \right] \right\} d\vec{\alpha}dv \right\} \quad (9)$$

Equation (9) is one form of the narrow field of view Michelson interferometer equation. Its significance of is that for each baseline position $\vec{B}=(B_x,B_y)$ and each time delay $\Delta t$ the interferometer observes one real number, $I_1(\vec{B},\Delta t)$, and thus as the baselines are moved and the delay line varied a 3D data set in the variables $(\vec{B},\Delta t)$ is realized. The sky brightness function, $I_0(\vec{\alpha};v)$, can be estimated at each frequency by Fourier techniques. Note that the sky angles have been combined in a vector $\vec{\alpha}=(\alpha,\beta)$.

In one aspect, the number of baselines and the maximum length of the baselines effectively filter which spatial frequencies are present in the estimated sky intensity and also limit the angular resolution. The length of delay line limits the spectral resolution and the delay line sampling limits the range of frequencies. The field of view is limited to approximately $+/-1\lambda/D$ where $\lambda$ is the wavelength and D the diameter of a single sub-aperture. This narrow field condition on the conventional Michelson is why wide field Michelson is needed.

Continuing the propagation from the exit pupil 210 to the focal plane involves a propagator which steps the field from the pupil 210 to focal plane and is given by the standard Fraunhofer propagator for each frequency. For an exit pupil field of the form $E_P(x,y,v)$ the focal plane field is given by:

$$E_F(\theta_x, \theta_y, v) = \int \int A(x, y) E_P(x, y, v) e^{-i2\pi\frac{v}{c}(\theta_x x + \theta_y y)} dx dy \quad (10)$$

where A(x,y) is the aperture function, unity inside and zero outside the aperture and $(\theta_x, \theta_y)$ are focal plane positions projected on the sky.

Following the steps outlined above, the interferometer equation can be derived. The focal plane intensity, projected on the sky, is given by $\langle E_1+E_2|^2 \rangle = \langle E_1|^2 \rangle + \langle E_2|^2 \rangle + 2\text{Re}\langle E_1 E_2^* \rangle$. Propagating to the focal plane yields:

$$\begin{cases} I_1(\theta_x, \theta_y) = I_2(\theta_x, \theta_y) \\ \quad = \int dv \int \int \int PSF(\alpha - \theta_x, \beta - \theta_y, v) I_0(\alpha, \beta; v) d\alpha d\beta \\ \langle E_1 E_2^* \rangle = \int e^{j2\pi v \Delta t} dv \int \int \int PSF(\alpha - \theta_x, \beta - \theta_y, v) I_0(\alpha, \beta; v) e^{-i\frac{2\pi v}{c}(\alpha B_x + \beta B_y)} d\alpha d\beta \end{cases} \quad (11)$$

where $PSF(\alpha-\theta_x,\beta-\theta_y,v)$ is the primary beam point spread function $I_0(\alpha,\beta;v)=|E_0(\alpha,\beta;v)|^2$ is the sky intensity at each wavelength. Equation (11) demonstrates that $I_1=I_2$ and that each takes the form of the sky brightness angularly convolved with the primary beam PSF and subsequently integrated over frequency and that these two terms are independent of baseline and delay.

The 3$^{rd}$ term in equation (11) is the interference term. Noting that the time delay can be expressed as a path length difference via $\Delta L=c\Delta t$ and by defining: $\vec{\theta}=(\theta_x,\theta_y)$, $\vec{B}=(B_x,B_y)$ and $\vec{\alpha}=(\alpha,\beta)$ yields for the focal plane intensity:

$$I_F(\vec{\theta}; \vec{B}, \Delta L) =$$
$$2\int_0^\infty \int_{-\infty}^{+\infty} PSF(\vec{\alpha} - \vec{\theta}, v) I_0(\vec{\alpha}; v) \left\{ 1 + \cos\left[ 2\pi \frac{v}{c}(\vec{\alpha}\cdot\vec{B} - \Delta L) \right] \right\} d\vec{\alpha} dv$$

All terms are real, i.e. not complex, and the frequency integral extends only over positive frequencies since negative frequencies do not exist.

Equation (12) is the interferometer equation which expresses the collected focal plane flux as a function of sky angle, baseline spacing and path length delay for a given sky brightness distribution. This form can be compared with equation (9), i.e. the conventional Michelson interferometer, and it is seen that the focal plane intensity is now also a function of $\vec{\theta}$, i.e. the location in the focal plane. The collected focal plane flux is a function of 5 variables (5-dimensional) given by $(\theta_x,\theta_y,B_x,B_y,\Delta L)$. Equation (9) can be obtained from equation (12) by integrating over all $d\vec{\theta}$ with the point spread function normalized such that $$\int_{-\infty}^{-\infty} PSF(\vec{\alpha} - \vec{\theta}) d\vec{\theta} = 1.$$

Equation (12) represents the starting point for estimating a hyperspectral data cube.

Next the disclosure turns to construction of the wide-field Michelson interferometer dirty data cube. The interesting problem is the inverse problem of constructing the sky brightness distribution, i.e. $I_0(\vec{\alpha} - \vec{\theta})$, at each frequency or wavelength from observations of $I_F(\vec{\theta};\vec{B},\Delta L)$. In a wide-field Michelson at optical frequencies the delay line is realized by moving an optic in one arm of the interferometer in a continuous fashion. The movable section can be in a one or two dimensional axis and can be moved linearly or rotationally. Metrology is used to determine the relative position of the mirror as a function of time and the path length delay is given by $\Delta L$. The baselines are realized by stepping the spacing between the two collecting apertures in a discrete fashion, i.e. the apertures are moved and stopped and then the delay line is moved through its range and a focal plane image collected at each delay line position, then the baseline mirrors are moved and the cycle repeated. This effectively generates the data described by equation (12) with a few caveats. Namely $\vec{B}$ is not continuous but consists of a finite set of discrete baselines and the delay line positions are sampled at discrete times and over a finite range and the detector pixels integrate over a finite area and are also spatially sampling. These effects combine to give a discretely sampled version of equation (12), in addition noise in the detector and instrumental errors also causes systematic and random effects in the collection of the data and ultimately in the estimation of the image. These effects are described below but first the basic image construction process is derived.

Let equation (12) be represented as the sum of two integrals:

$$I_F(\vec{\theta}; \vec{B}, \Delta L) = 2\int_0^\infty \int_{-\infty}^{+\infty} PSF(\vec{\alpha} - \vec{\theta}, v) I_0(\vec{\alpha}; v) d\vec{\alpha} dv + \quad (13)$$

$$2\int_0^\infty \int_{-\infty}^{+\infty} PSF(\vec{\alpha} - \vec{\theta}, v) I_0(\vec{\alpha}; v) \cos\left[2\pi\frac{v}{c}(\vec{B} \cdot \vec{\alpha} - \Delta L)\right] d\vec{\alpha} dv$$

Average over delays are denoted as $$I_{Ave}(\vec{\theta}) = \lim_{L \to \infty} \frac{1}{L} \int_0^L \cdots d\Delta L.$$

The average of equation (13) is evaluated as:

$$I_{Ave}(\vec{\theta}) = \lim_{L \to \infty} \frac{1}{L} \int_0^L I_F(\vec{\theta}; \vec{B}, \Delta L) d\Delta L \quad (14)$$

$$= 2\int_0^\infty \int_{-\infty}^{+\infty} PSF(\vec{\alpha} - \vec{\theta}, v) I_0(\vec{\alpha}; v) d\vec{\alpha} dv$$

$$= 2\int_0^\infty PSF(\vec{\theta}, v) ** I_0(\vec{\theta}; v) dv$$

$I_{Ave}(\vec{\theta})$ is independent of the baseline and is obtained for each focal plane position $\vec{\theta}$ by averaging its interferogram over the delay line positions and across all baselines. The primary beam point spread function is convolved with the object and integrated over all frequencies.

Let the interferograms with the time averaged removed at each baseline and focal plane pixel be defined by:

$$v(\vec{\theta}; \vec{B}, \Delta L) \equiv \frac{I_F(\vec{\theta}; \vec{B}, \Delta L) - I_{Ave}(\vec{\theta})}{I_{Ave}(\vec{\theta})} \quad (15)$$

$$= \frac{2}{I_{Ave}(\vec{\theta})} \int_0^\infty dv \int_{-\infty}^{+\infty} PSF(\vec{\alpha} - \vec{\theta}, v) I_0(\vec{\alpha}; v) \cos$$

-continued $$\left[2\pi\frac{v}{c}(\vec{B} \cdot \vec{\alpha} - \Delta L)\right] d\vec{\alpha}$$

Equation (15) can be converted to its quadrature term by evaluating its Hilbert transform with respect to $\Delta L$ to yield:

$$H\{V(\vec{\theta}; \vec{B}, \Delta L)\} = \quad (16)$$

$$\frac{2}{I_{Ave}(\vec{\theta})} \int_0^\infty dv \int_{-\infty}^{+\infty} PSF(\vec{\alpha} - \vec{\theta}, v) I_0(\vec{\alpha}; v) \sin\left[2\pi\frac{v}{c}(\vec{B} \cdot \vec{\alpha} - \Delta L)\right] d\vec{\alpha}$$

An analytic form can be constructed from equations (15) and (16) as:

$$V^{(a)}(\vec{\theta}; \vec{B}, \Delta L) = V(\vec{\theta}; \vec{B}, \Delta L) - iH\{V(\vec{\theta}; \vec{B}, \Delta L)\} \quad (17)$$

$$= \frac{2}{I_{Ave}(\vec{\theta})} \int_0^\infty dv \int_{-\infty}^{+\infty} PSF(\vec{\alpha} - \vec{\theta}, v)$$

$$I_0(\vec{\alpha}; v) e^{-i2\pi\frac{v}{c}(\vec{B} \cdot \vec{\alpha} - \Delta L)} d\vec{\alpha}$$

Fourier transforming over $\Delta L$ with $v'/c$ as the conjugate Fourier variables yields:

$$\tilde{V}^{(a)}(\vec{\theta}; \vec{B}, v') = \frac{2}{I_{Ave}(\vec{\theta})} \int_{-\infty}^{+\infty} PSF(\vec{\alpha} - \vec{\theta}, v') O(\vec{\alpha}; v') e^{-i2\pi\frac{v'}{c}\vec{B} \cdot \vec{\alpha}} d\vec{\alpha} \quad (18)$$

Define the inverse Fourier transform with respect to baseline, $\vec{B}$, but with $v'/c\,\vec{\theta}$ as the conjugate Fourier variable as:

$$\tilde{\tilde{V}}^{(a)}(\vec{\theta}, v') = \int_{-\infty}^{+\infty} \tilde{V}^{(a)}(\vec{\theta}; \vec{B}, v') e^{i2\pi\frac{v'}{c}\vec{B} \cdot \vec{\theta}} d\vec{B} \quad (19)$$

However only a finite set of discrete baselines $\{\vec{B}_j\}_{j=1,\ldots,N_B}$ exists, implying that $$\int_{-\infty}^{+\infty} \tilde{V}^{(a)}(\vec{\theta}; \vec{B}, v') e^{i2\pi\frac{v'}{c}\vec{B} \cdot \vec{\theta}} d\vec{B} \to \quad (20)$$

$$\sum_{j=1}^{N_B} \int_{-\infty}^{+\infty} \tilde{V}^{(a)}(\vec{\theta}; \vec{B}, v') \delta(\vec{B} - \vec{B}_j) e^{i2\pi\frac{v'}{c}\vec{B} \cdot \vec{\theta}} d\vec{B} =$$

$$\sum_{j=1}^{N_B} \tilde{V}^{(a)}(\vec{\theta}; \vec{B}_j; v') e^{i2\pi\frac{v'}{c}\vec{B}_j \cdot \vec{\theta}}$$

Inserting equation (20) into (19) and re-arranging gives equation (21) shown below:

$$\tilde{\tilde{V}}^{(a)}(\vec{\theta}, v') = \quad (21)$$

$$\frac{2}{I_{Ave}(\vec{\theta})} \int_{-\infty}^{+\infty} O(\vec{\alpha}; v') PSF(\vec{\alpha} - \vec{\theta}, v') \sum_{j=1}^{N_B} e^{-i2\pi\frac{v'}{c}\vec{B}_j \cdot (\vec{\alpha} - \vec{\theta})} d\vec{\alpha}$$

Defining $$PSF_d(\vec{\theta}, v') \sum_{j=1}^{N_B} e^{-i2\pi \frac{v'}{c} \vec{B}_j \cdot \vec{\theta}}$$

as the complex dirty yields:

$$\tilde{V}^{(a)}(\vec{\theta}, v') = \frac{2}{I_{Ave}(\vec{\theta})} \int_{-\infty}^{+\infty} O(\vec{\alpha}; v') PSF_d(\vec{\alpha} - \vec{\theta}, v') d\vec{\alpha} \quad (22)$$

$$= \frac{2}{I_{Ave}(\vec{\theta})} PSF_d(\vec{\theta}, v') ** O(\vec{\theta}; v')$$

where ** denotes two-dimensional convolution.

Thus the dirty image is given by $PSF_d(\vec{\theta},v')**O(\vec{\theta},v')$ and thus is given at:

$$I_d(\vec{\theta}, v') = \frac{I_{Ave}(\vec{\theta})}{2} \text{Re}\{\tilde{V}^{(a)}(\vec{\theta}, v')\} \quad (23)$$

This result shows that the dirty image cube, at each frequency can be constructed from the set of baseline cubes via the Hilbert transform, a set of Fourier transforms over each of the delay line interferograms, then a discrete inverse Fourier transform across the set of baselines.

In the discretely sampled focal plane the sampling is $$\Delta\theta \leq \frac{\lambda}{2D}$$

i.e. approximately Nyquist sampled with respect to the diameter, D, of a single aperture where $\lambda=c/v$ is the wavelength. The phasor sum in equation (21) can benefit from sampling of $$\Delta\theta \leq \frac{\lambda}{2|\vec{B}_j|}$$

and since $|\vec{B}_j|>D$ in general, or at least for any useful interferometer, direct evaluation of equation (21) may result in severe aliasing. One exemplary approach is to employ the Fourier shift theorem. Take the Fourier transform of $\tilde{V}^{(a)}(\vec{\theta},v')$ with respect to $\vec{\theta}$ and with $\vec{u}$ as the conjugate Fourier variable to show:

$$\int_{-\infty}^{+\infty} \tilde{V}^{(a)}(\vec{\theta}, v') e^{-i2\pi \vec{u}\cdot\vec{\theta}} d\vec{\theta} = \int_{-\infty}^{+\infty} \sum_{j=1}^{N_B} \tilde{V}^{(a)}(\vec{\theta}; \vec{B}_j, v') e^{i2\pi \frac{v'}{c} \vec{B}_j \cdot \vec{\theta}} e^{-i2\pi \vec{u}\cdot\vec{\theta}} d\vec{\theta} \quad (24)$$

$$= \sum_{j=1}^{N_B} \int_{-\infty}^{+\infty} \tilde{V}^{(a)}(\vec{\theta}; \vec{B}_j, v') e^{-i2\pi(\vec{u} - \frac{v'}{c}\vec{B}_j)\cdot\vec{\theta}} d\vec{\theta}$$

$$= \sum_{j=1}^{N_B} \tilde{\tilde{V}}^{(a)}\left(\vec{u} - \frac{v'}{c}\vec{B}_j; \vec{B}_j, v'\right)$$

and recognizing that $$\tilde{\tilde{V}}^{(a)}\left(\vec{u} - \frac{v'}{c}\vec{B}_j; \vec{B}_j, v'\right)$$

is the Fourier transform of $\tilde{V}^{(a)}(\vec{\theta};\vec{B}_j,v')$ but shifted to $$\frac{v'}{c}\vec{B}_j$$

in the $\vec{u}$ domain. Thus, the procedure is to Fourier transform $\tilde{V}^{(a)}(\vec{\theta};\vec{B},v')$ at each baseline and frequency into the $\vec{u}$ domain. Then numerically shift them into a larger grid such that the origin is shifted to $$\vec{u} = \frac{v'}{c}\vec{B}_j.$$

This results in a large grid in the $\vec{u}$ domain at each frequency and each of these is subsequently inverse transformed to yield $\tilde{\tilde{V}}^{(a)}(\vec{\theta},v')$ on a larger sampled grid. This procedure is performed for each frequency and the results used to estimate the dirty image cube. Discrete Fourier transform techniques can provide enhanced results with sparsely populated grids.

$I_{Ave}(\vec{\theta})$ is sampled at lower resolution than the result from equation (23) and hence can be interpolated. This is straightforward since $I_{Ave}(\vec{\theta})$ does not contain any interference and thus its spatial frequencies are limited to the spatial frequencies of the primary beam.

Figure 3:
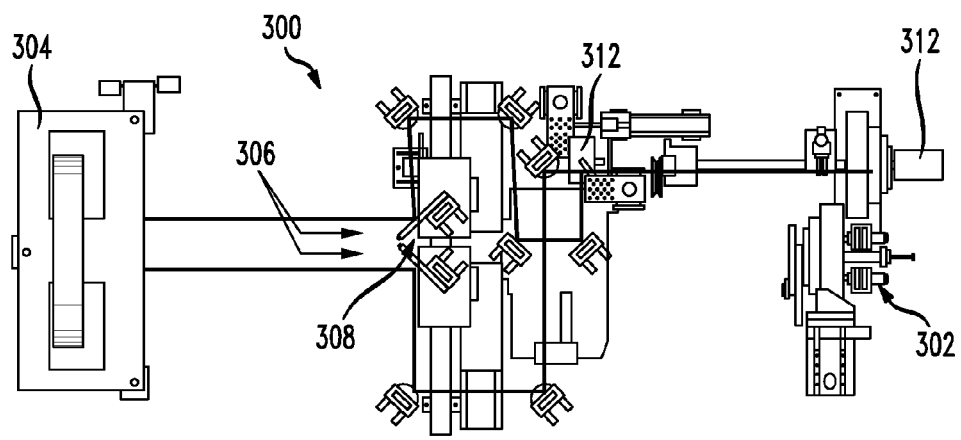
FIG. 3 illustrates an example wide-field imaging interferometry testbed (WIIT)

The disclosure now turns to a discussion of the process to construct a wide-field imaging interferometry testbed (WIIT) dirty image cube. FIG. 3 illustrates an example schematic of WIIT 300. WIIT 300 is described here from a processing point of view. Light from the source module 302, with selectable test scenes, reflects off the large collimating parabola 304 and enters the two movable reflective apertures 306 of WIIT 300. The source module 302 is at the focus of the collimating parabola 304. These apertures 306 move top to bottom on a sliding rail and the distance between them is the baseline 308. A series of relay optics 310 fold the beams from each of the two apertures around to the beamsplitter 312 which combines the two beams in the pupil plane. Subsequently a lens 314 brings them to focus onto the CCD camera 316. An actuated moving carriage which has laser metrology generates an optical delay by providing differential path length positions between the two arms of the interferometer. The source scene can be rotated to provide 2D baselines and hence emulation of two interferometric dimensional imaging.

Figure 4:
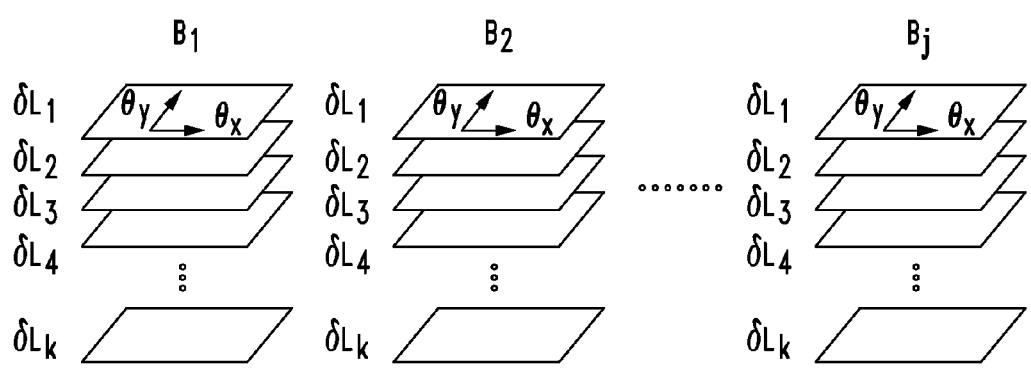
FIG. 4 illustrates an example data format for WIIT data.

FIG. 4 illustrates an example data format for WIIT data and the layout of the WIIT data as it is collected. At a given baseline position the system 100 collects a data cube. Each plane of the cube is a 32×48 pixel image representing the two dimensional field of view. In this example, the delay line includes about 5000-7000 steps and thus this number of frames to each baseline cube. Each baseline cube can be stored as a self-contained Flexible Image Transport System (FITS) data cube in Tables format with the metrology data for each delay line position. Baseline cubes can be stored in other suitable formats as well. In one embodiment, the delay line moves in approximate increments of 9.89 nm and the detector pixel sizes are 2.475 arcseconds. Other dimensions and distances are contemplated. Initial processing loads each baseline cube sequentially, parses the differential delay lines positions table, and interpolates the data to equal increments of the delay such that the delay line sampling is uniform for each of the baseline cubes.

Figure 5:
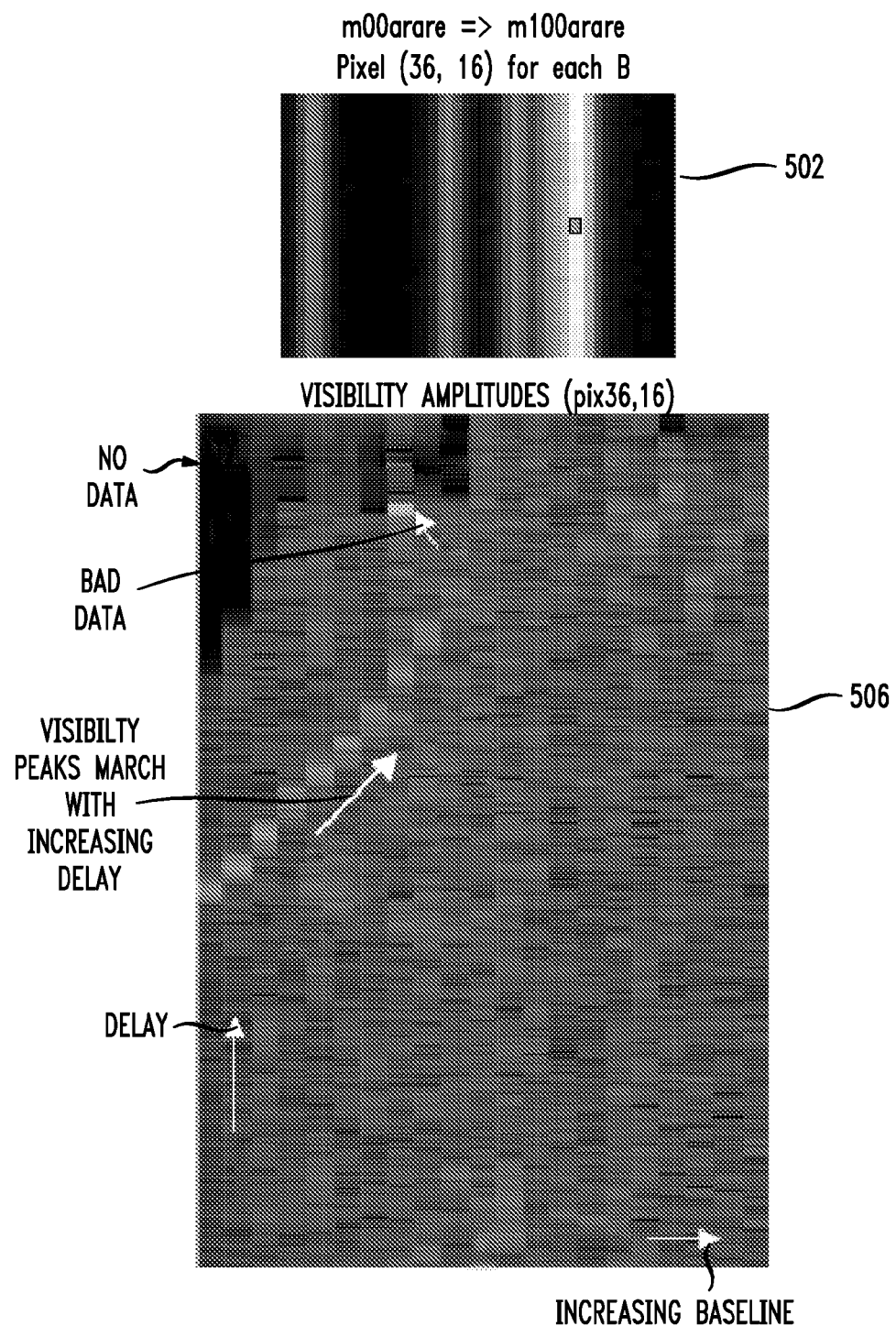
FIG. 5 illustrates example WIIT interferograms and visibilities.
Figure 5A:
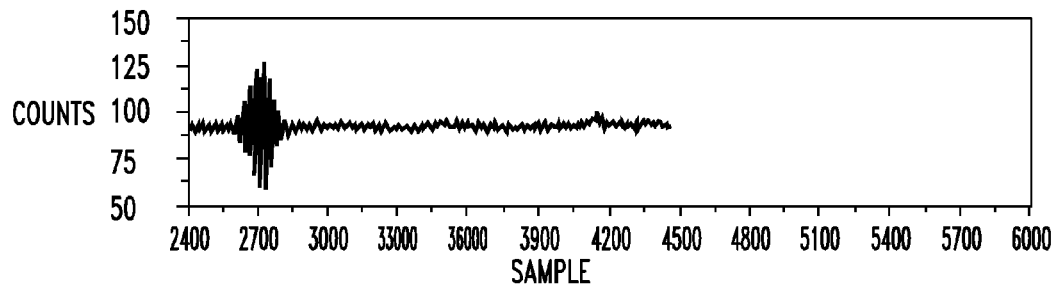
Figure 5B:
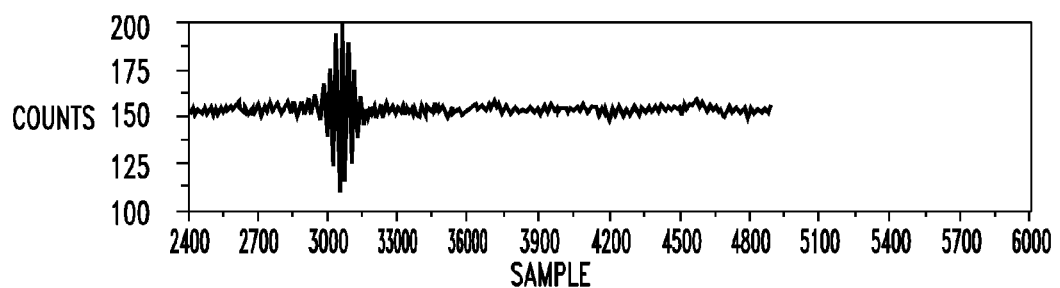
Figure 5C:
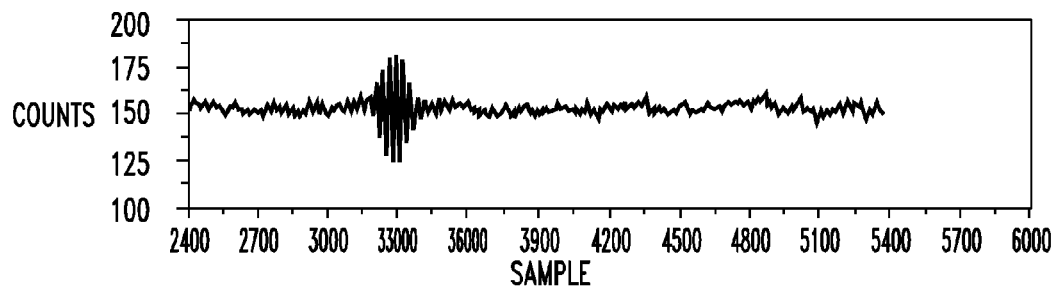
Figure 5D:
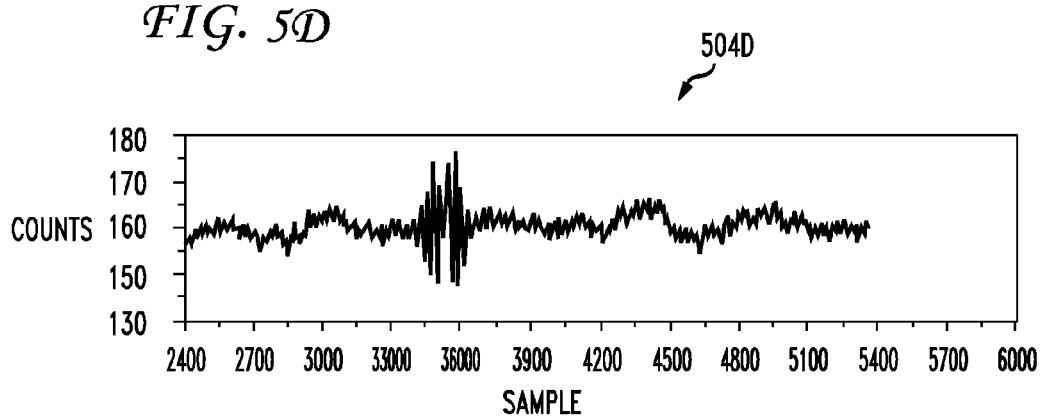
Figure 5E:
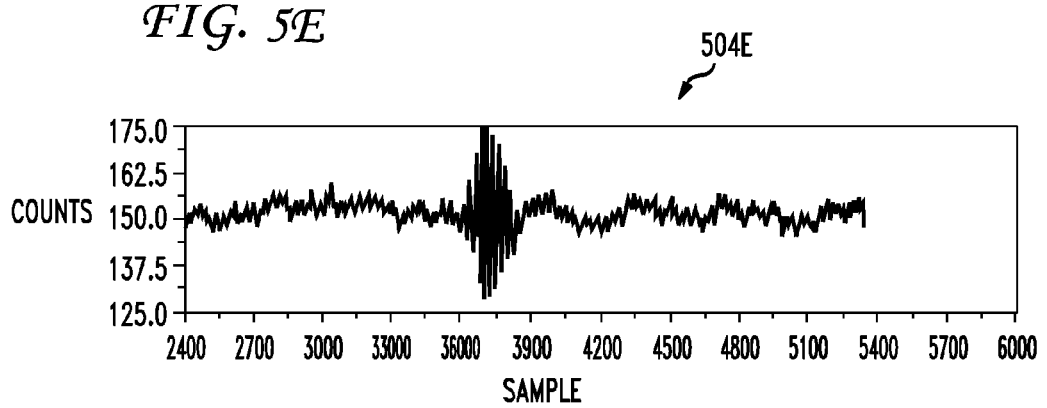
Figure 5F:
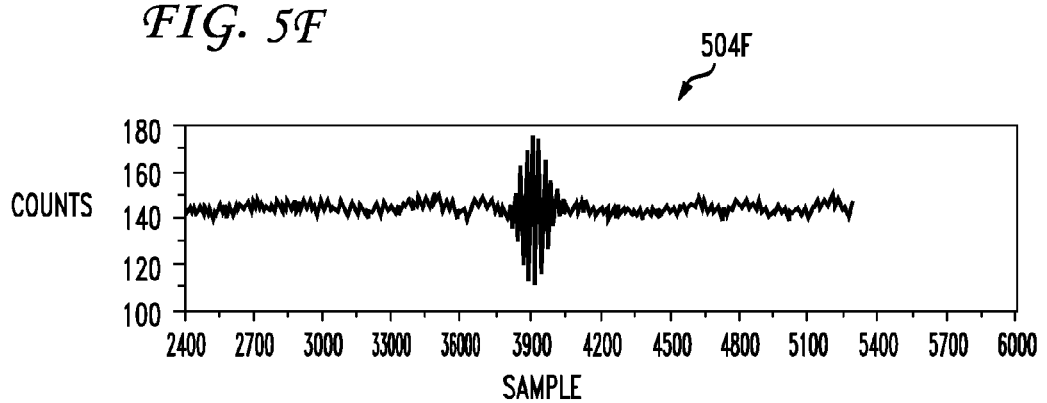

FIG. 5 illustrates example WIIT interferograms and visibilities. A single frame image 502 of an observed WIIT data cube can be a predetermined size, such as 48 pixels×32 pixels. Plots 504A-504F show counts versus delay line position for the pixel at location 36×16 of the single frame image 502 for 6 different increasing baselines. The interference pattern moves to the right with increasing baseline. An image of the visibility amplitudes 506 at the pixel at location 36×16 represents the increasing baseline for all 21 baselines (left to right) and versus delay (top to bottom). The visibilities pattern moves towards the upper right and diminishes. Visibilities are obtained via the Hilbert transform.

Figure 6:
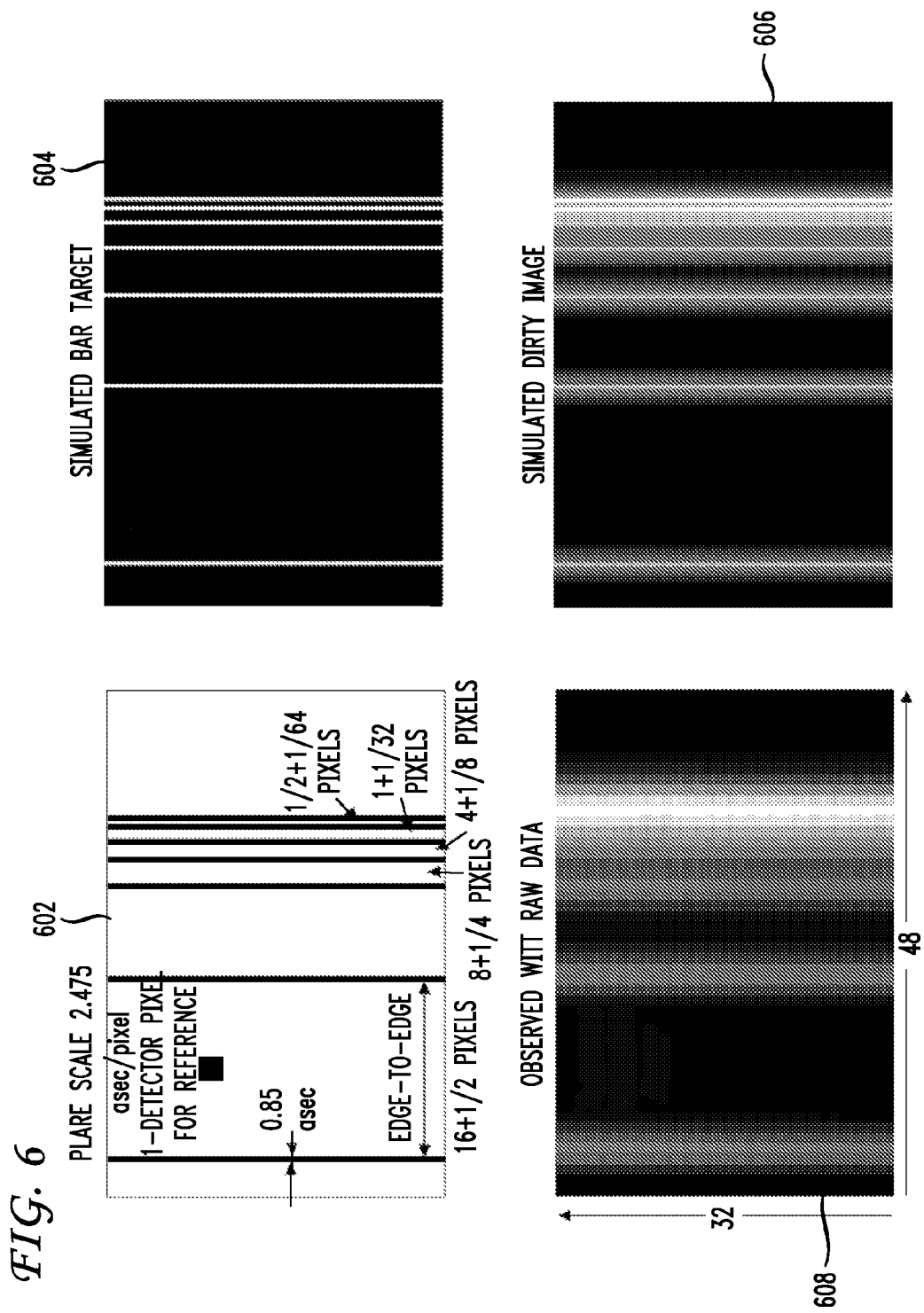
FIG. 6 illustrates an example WIIT fractal bar target and images.

FIG. 6 illustrates an example WIIT fractal bar target and images used for a test scene. The geometry of the test mask 602 includes 7 bars where light is passed such that each successive bar from left to right is closer together by a factor of ½ from the previous. The mask, or simulated bar target, 604 is shown and an observed WIIT image 606, based on raw WIIT data, is shown. In one aspect, the left most bars are resolved while tending to blur together towards the right as they pass through the primary beam resolution limit. The width of a bar can be 0.85 arcseconds as compared to a detector element width of 2.475 arcseconds and is thus unresolved. The simulated dirty image 608 illustrates what the bar target can look like after processing.

Figure 7:
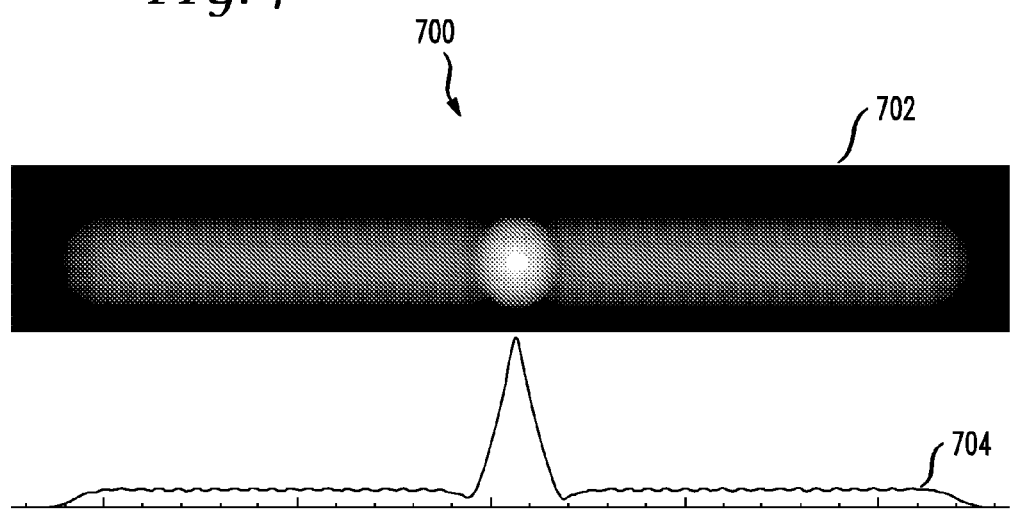
FIG. 7 illustrates an example image of WIIT one-dimensional ultraviolet plane coverage.

FIG. 7 illustrates an example image 702 of WIIT one-dimensional ultraviolet plane coverage. Imaging of the bar target is accomplished by moving the two WIIT apertures to 21, for example, positions in one dimension resulting in the UV-plane coverage 704, modulation transfer function (MTF). The MTF is completely filled in one dimension except for a slight dip 706 near the origin due to the apertures coming close together but because of hardware limitations not touching.

FIG. 8 illustrates an exemplary WIIT dirty beam for the 21 baselines. The dirty beam is shown on a linear scale 802, on a log scale 804, and as a plot through its center 806. A fringe narrow with respect to the core of the primary beam is evident in the center and this fringe width defines the limiting resolution of WIIT.

Figure 9:
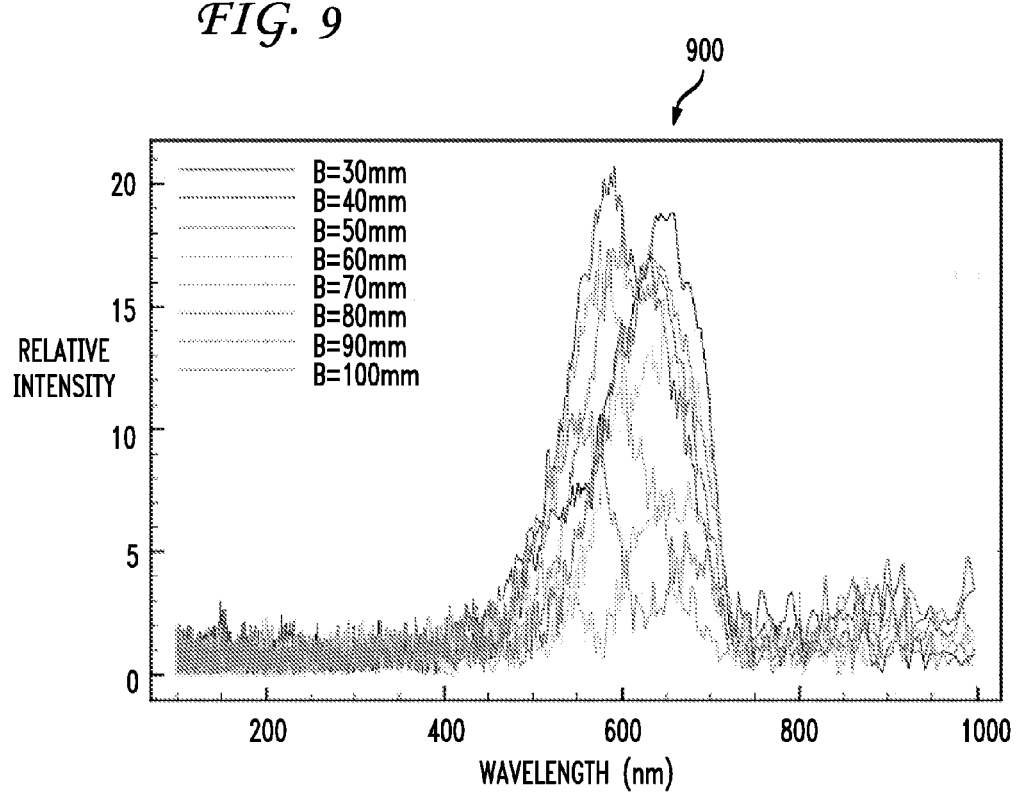
FIG. 9 illustrates example WIIT spectra for varying baselines.

FIG. 9 illustrates example WIIT spectra for varying baselines. FIG. 9 shows spectra 900 as processed from the delay data for the brightest data pixel for each baseline cube. The variability shown in the spectra 900 is likely the result of the processing algorithm and may not perfectly accurately reflect actual spectra 900.

Figure 10:
FIG. 10 illustrates sample WIIT dirty image data results and maximum entropy deconvolutions.

FIG. 10 illustrates sample WIIT dirty image data results and maximum entropy deconvolutions. FIG. 10 shows the first estimate of the dirty image 1002 of the one dimensional fractal bar target 602 of FIG. 6. The exemplary image 1002 shown is at one wavelength (600 nm) which corresponds to the peak of the spectrum shown in FIG. 9 and the output image is 1024×1024 samples. The dirty image 1002 shows some edge ringing from the bar targets and the phases of the recovered Fourier components of this dirty image 1002 may not be entirely correct. The four frames 1004, 1006, 1008, 1010 below the top frame 1002 in FIG. 10 show a maximum entropy deconvolution for 5, 10, 15 and 20 iterations respectively. The inputs are the estimated dirty image and the calculated dirty beam shown in FIG. 8 and a specialized form of maximum entropy is used which incorporate maximum likelihood constraints and is optimized for ill-posed inversion problems such as interferometric aperture imaging. A Hilbert transform based algorithm can estimate the visibility amplitudes and phases in a relative sense across the wide-field of view. Maximum entropy methods can assist in better estimating the object in the dirty image cube.

Figure 11:
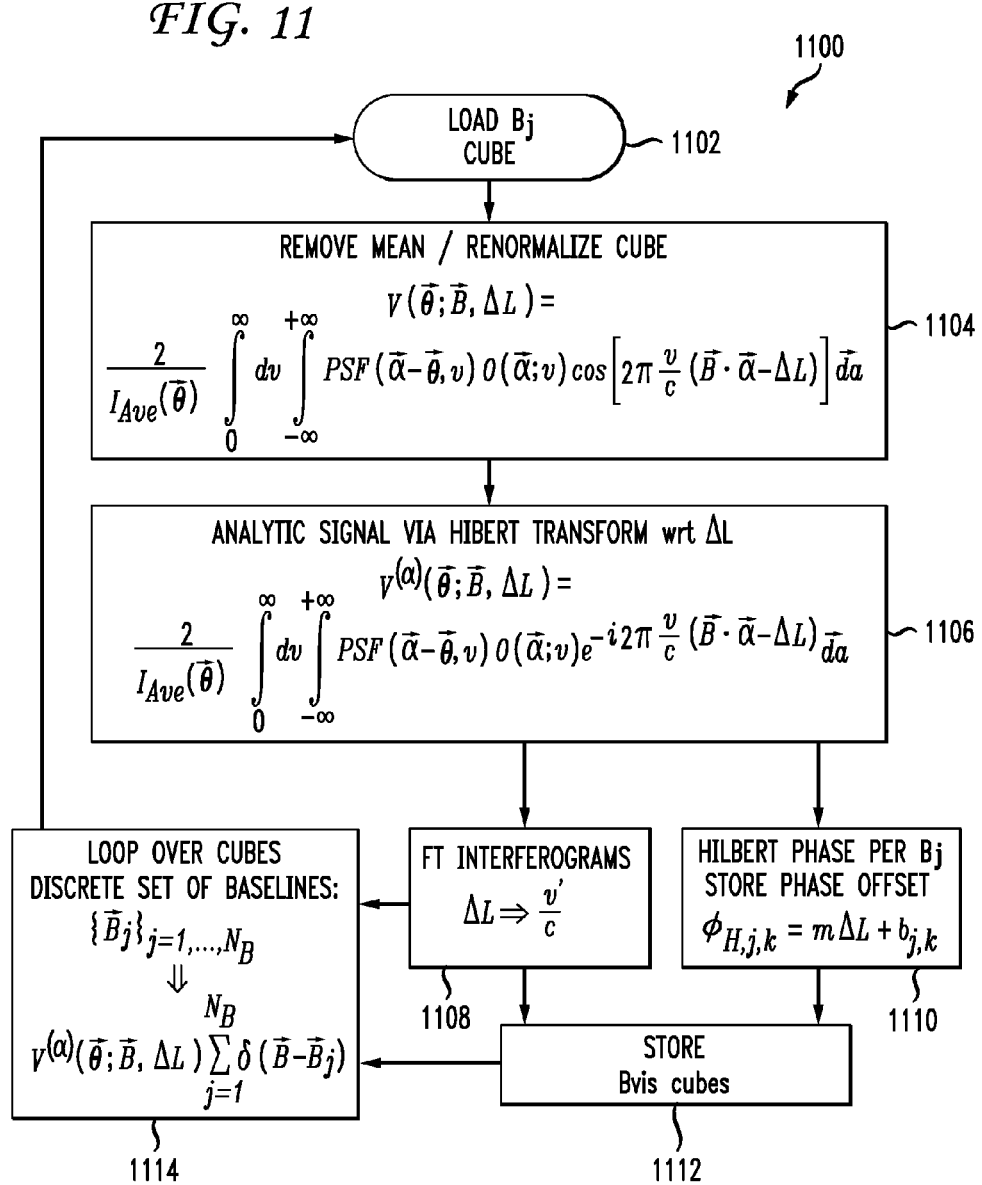
FIG. 11 illustrates an example inverse Fourier transform over B with $\theta$ as a conjugate variable.

FIG. 11 illustrates an example inverse Fourier transform over B with θ as a conjugate variable. FIG. 11 demonstrates the steps 1100 to generate a wide field hyperspectral data cube from a set of dirty image cubes. First a system 100, such as that shown in FIG. 1, loads the $B_j$ cube 1102. The system 100 removes the mean and renormalizes the loaded cube 1004 as shown by the equation in box 1004. The system 100 generates an analytic signal via a Hilbert Transform with respect to ΔL 1106. The system uses a Fourier transform to generate interferograms 1108 based on the analytic signal. The system 100 also uses a Hilbert phase transform per $B_j$ to store the phase offsets 1110. The system 100 combines these results to store Bvis cubes 1112. The system loops over the set of cubes representing discrete sets of baselines 1114 until no cubes remain.

Figure 12:
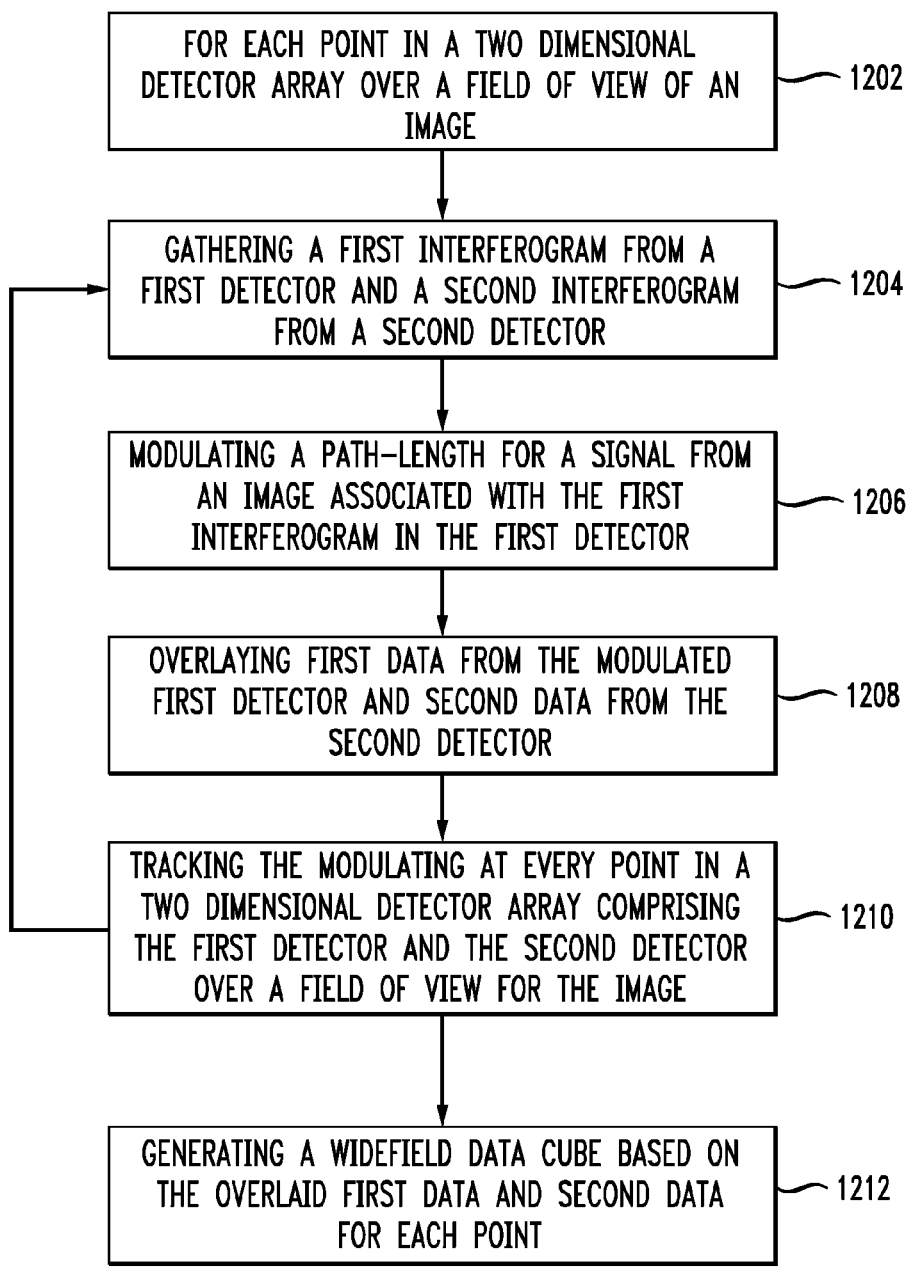
FIG. 12 illustrates an exemplary method embodiment.

FIG. 12 illustrates an exemplary method embodiment for wide field imaging interferometry. The method can be performed by an appropriately configured system 100 such as that shown in FIG. 1. The system 100 first performs the following steps for each point in a two dimensional detector array over a field of view of an image: gathering a first interferogram from a first detector and a second interferogram from a second detector (1202), modulating a path-length for a signal from an image associated with the first interferogram in the first detector (1204), overlaying first data from the modulated first detector and second data from the second detector (1206), and tracking the modulating at every point in a two dimensional detector array comprising the first detector and the second detector over a field of view for the image (1208). The detectors can be telescopes. The interferograms can represent visible light, invisible light (such as infrared), sound, radio waves, seismic waves, gravitational waves, or any other suitable type of wave.

Figure 15:
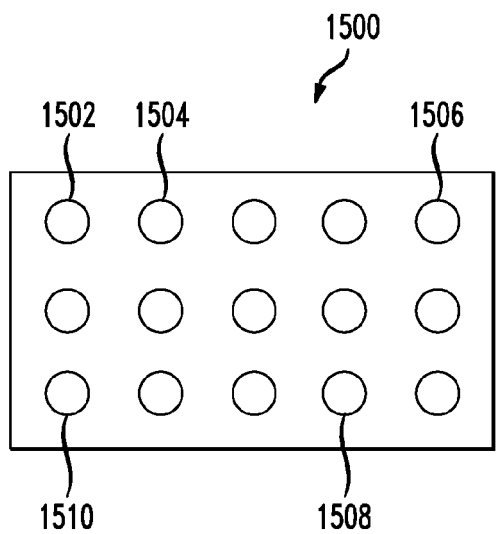
FIG. 15 illustrates an example grid configuration of more than two detectors.

The system 100 then generates a widefield data cube based on the overlaid first data and second data for each point (1210). The system 100 can then generate an image from the widefield data cube. In one embodiment, the system selects the first and second detectors from a group of three or more detectors, such as a grid or array of detectors. FIG. 15, discussed below, illustrates on such possible configuration. The first and second detectors can be different physical detectors for each point. In one aspect, the system 100 gathers more than one first and second interferograms at different distances between the first and second detectors for each point in the two dimensional detector array. In another variation, the system 100 gathers more than one first and second interferograms at different locations for the first and second detectors for each point in the two dimensional detector array.

Figure 13:
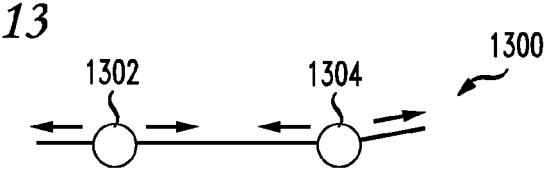
FIG. 13 illustrates an example configuration of two detectors on a boom.

FIG. 13 illustrates an example configuration of two detectors on a single boom. A single boom 1300, rod, or other linear structure attaches to two detectors 1302, 1304. The detectors slide back and forth on the boom 1300 to detect at different distances from each other. This example configuration provides an image of dimensions roughly corresponding to the shape and size of the boom 1300.

Figure 14:
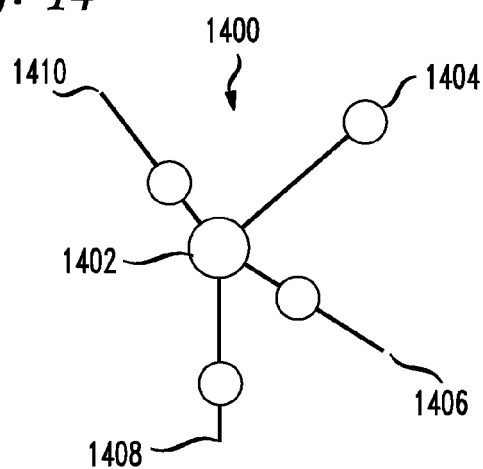
FIG. 14 illustrates an example configuration of two detectors on a rotatable boom.

FIG. 14 illustrates an example configuration of two detectors on a rotatable boom 1400. The first detector 1402's position is fixed on a boom 1400. The boom rotates about the first detector 1402 and the second detector slides along the boom 1400 at different distances from the first detector 1402. For instance, at position 1404, the second detector is at the farthest possible distance away from the first detector 1402. At position 1406, the boom 1400 has rotated clockwise and the second detector has moved slightly closer to the first detector 1402. At position 1408, the boom 1400 has rotated further clockwise and the second detector has again changed distance on the boom relative to the first detector 1402. At position 1410, the boom 1400 has rotated almost a complete 360° to position 1404, and the second detector is very close to the first detector 1402. With an appropriate number of samples from various distances and rotational positions, this system can generate a wide-field image equivalent to that of a much larger single detector or telescope.

FIG. 15 illustrates an example grid configuration 1500 of more than two detectors. This grid configuration can be static or all or part of the grid can be dynamically movable. The first and second detector can be different detectors in the grid for each iteration or for multiple iterations of the same point. For example, the first and second detectors can be detectors 1502 and 1504. For a next point, the first and second detectors can be detectors 1502 and 1506, or 1502 and 1508, or 1506 and 1510. In some cases, multiple detectors in the grid can act on the same point at the same time. In another aspect, the first detector 1502 can pair with multiple second detectors 1504, 1506, 1508, 1510 simultaneously. The distance between the detectors varies through one approach or another.

Embodiments within the scope of the present disclosure may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can apply to. Those skilled in the art will readily recognize various modifications and changes that may be made to the principles described herein without following the example embodiments and applications illustrated and described herein, and without departing from the spirit and scope of the disclosure.

We claim:

1. A computer-implemented method of wide field imaging interferometry, the method comprising:

for each point in a two dimensional detector array over a field of view of an image with all steps implemented within a computer processor: gathering a first interferogram from a first detector and a second interferogram from a second detector, in a computer modulating a path-length for a signal from an image associated with the first interferogram in the first detector, overlaying first data from the modulated first detector and second data from the second detector in the computer processor, and tracking the modulating at every point in a two dimensional detector array comprising the first detector and the second detector over a field of view for the image; and generating a widefield data cube based on the overlaid first data and second data for each point.

2. The computer-implemented method of claim 1, the method further comprising generating an image from the widefield data cube.

3. The computer-implemented method of claim 1, wherein at the first and second detectors are selected from a group of three or more detectors.

4. The computer-implemented method of claim 1, wherein at least one of the first and second detectors is different for each point.

5. The computer-implemented method of claim 1, the method further comprising gathering more than one first and second interferograms at different distances between the first and second detectors for each point in the two dimensional detector array.

6. The computer-implemented method of claim 1, the method further comprising gathering more than one first and second interferograms at different locations for the first and second detectors for each point in the two dimensional detector array.

7. The method of claim 1, wherein the gathered first and second interferograms represent visible light.

8. The method of claim 1, wherein the gathered first and second interferograms represent a wave other than visible light.

9. The method of claim 1, wherein the detectors are telescopes.

10. A system for wide field imaging interferometry, the system comprising:
a processor;
a module configured to control the processor to perform the following steps for each point in a two dimensional detector array over a field of view of an image: gathering a first interferogram from a first detector and a second interferogram from a second detector, modulating a path-length for a signal from an image associated with the first interferogram in the first detector, overlaying first data from the modulated first detector and second data from the second detector, and tracking the modulating at every point in a two dimensional detector array comprising the first detector and the second detector over a field of view for the image;
and a module configured to control the processor to generate a widefield data cube based on the overlaid first data and second data for each point.

11. The system of claim 10, the system further comprising a module configured to control the processor to generate an image from the widefield data cube.

12. The system of claim 10, wherein at the first and second detectors are selected from a group of three or more detectors.

13. The system of claim 10, wherein at least one of the first and second detectors is different for each point.

14. The system of claim 10, the system further comprising a module configured to control the processor to gather more than one first and second interferograms at different distances between the first and second detectors for each point in the two dimensional detector array.

15. The system of claim 10, the system further comprising a module configured to gather more than one first and second interferograms at different locations for the first and second detectors for each point in the two dimensional detector array.

16. A tangible computer-readable storage medium excluding all transitory storage media storing a computer program having instructions to control a processor for wide field imaging interferometry, the instructions comprising: for each point in a two dimensional detector array over a field of view of an image:
gathering a first interferogram from a first detector and a second interferogram from a second detector, modulating a path-length for a signal from an image associated with the first interferogram in the first detector, overlaying first data from the modulated first detector and second data from the second detector, and tracking the modulating at every point in a two dimensional detector array comprising the first detector and the second detector over a field of view for the image; and
generating a widefield data cube based on the overlaid first data and second data for each point.

17. The tangible computer-readable storage medium of claim 16, the instructions further comprising generating an image from the widefield data cube.

18. The tangible computer-readable storage medium of claim 16, wherein at the first and second detectors are selected from a group of three or more detectors.

19. The tangible computer-readable storage medium of claim 16, wherein at least one of the first and second detectors is different for each point.

* * * * *